United States Patent
Koroukian (10) Patent No.: US 9,813,888 B1
(45) Date of Patent: Nov. 7, 2017

(54) GLOBAL NETWORK COMMUNICATION SYSTEM

(71) Applicant: Mikael Koroukian, Laguna Niguel, CA (US)

(72) Inventor: Mikael Koroukian, Laguna Niguel, CA (US)

( * ) Notice: Subject to any disclaimer, the term of this patent is extended or adjusted under 35 U.S.C. 154(b) by 22 days.

(21) Appl. No.: 15/197,327

(22) Filed: Jun. 29, 2016

(51) Int. Cl.
| | |
|---|---|
| *H04M 1/00* | (2006.01) |
| *H04W 8/06* | (2009.01) |
| *H04W 8/08* | (2009.01) |
| *H04L 29/08* | (2006.01) |

(52) U.S. Cl.
CPC ............ *H04W 8/065* (2013.01); *H04L 67/34* (2013.01); *H04W 8/08* (2013.01)

(58) Field of Classification Search
None
See application file for complete search history.

(56) References Cited

U.S. PATENT DOCUMENTS

| | | | |
|---|---|---|---|
| 6,907,242 | B2 | 6/2005 | Thakker |
| 7,505,769 | B2 | 3/2009 | Jiang |
| 8,467,831 | B2 | 6/2013 | Camilleri et al. |
| 8,649,789 | B2 | 2/2014 | Shi et al. |
| 8,725,139 | B2 | 5/2014 | Waller |
| 8,825,106 | B2 | 9/2014 | Shaw |
| 8,938,232 | B2 | 1/2015 | Manso |
| 8,965,366 | B1 | 2/2015 | Somayajula et al. |
| 2005/0020243 | A1 | 1/2005 | Benco et al. |
| 2005/0216345 | A1 | 9/2005 | Altberg et al. |
| 2008/0020755 | A1 | 1/2008 | Liu et al. |
| 2010/0311444 | A1 | 12/2010 | Shi et al. |
| 2011/0059738 | A1 | 3/2011 | Waller |
| 2011/0306318 | A1 | 12/2011 | Rodgers et al. |
| 2012/0231835 | A1 | 9/2012 | Zhang et al. |
| 2012/0282924 | A1 | 11/2012 | Tagg et al. |
| 2013/0188554 | A1 | 7/2013 | Cai et al. |
| 2013/0242982 | A1 | 9/2013 | Kundaje et al. |
| 2014/0031034 | A1 | 1/2014 | Schroter |
| 2014/0057600 | A1 | 2/2014 | Dung |
| 2014/0220930 | A1* | 8/2014 | Maharaj ............... H04M 15/09 455/406 |
| 2015/0148032 | A1 | 5/2015 | Rainer et al. |
| 2015/0163731 | A1 | 6/2015 | Kotecha |
| 2015/0312873 | A1 | 10/2015 | Cormier et al. |

OTHER PUBLICATIONS

International Search Report & Written Opinion from counterpart International PCT Application No. PCT/US2016/052447, 12 pages.

* cited by examiner

*Primary Examiner* — Suhail Khan
(74) *Attorney, Agent, or Firm* — Innovation Capital Law Group, LLP; Vic Lin (57) ABSTRACT

When a wireless device is outside of its home service area, the device typically has to use expensive roaming data or phone services. However, as herein described, a global SIM may be inbuilt into a device, plugged into a second SIM port of the device, or may be added onto a device through one of the existing ports of the device. The global SIM allows the user to register for a service plan with a local service provider when in a foreign country. A software application on the wireless device can control the selection and purchase of local service plans, as well as control the switching of SIM data to ensure that a local SIM is used when traveling. The global SIM is capable of storing multiple registered service plans and the necessary data for the wireless device to operate as a local device when outside of the home service area.

19 Claims, 2 Drawing Sheets

GLOBAL NETWORK COMMUNICATION SYSTEM

BACKGROUND OF THE INVENTION

1. Field of the Invention

One or more embodiments of the invention relates generally to wireless communication systems. More particularly, the invention relates to a system that permits electronic devices, including mobile and stationary devices, to communicate wirelessly with telecommunication network carriers worldwide.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Almost every country has at least one Global System for Mobile (GSM) service provider. Each GSM service provider provides various packages for wireless communications, including packages for phone calls, short messaging services (SMS) and data services useful for email, internet browsing, global positioning satellite (GPS) systems, and the like.

Many people own wireless devices that send and receive data and place and receive phone calls within their home network. These people typically sign up for a package that includes phone, data, SMS and the like, and often pay a flat fee for such service. However, when these people leave their home service area, typically by traveling to a foreign country, they are no longer covered by such pre-purchased packages and are considered "roaming", where the fees for phone, data and SMS may be substantially greater than that they are used to paying in their home territory.

Most travelers make special arrangements to obtain roaming services to enable the usage of their wireless devices while they are out of their home territory. This service links their number to the global network so that the number can be used in various countries. Various technologies are available and have been proposed to properly route a "roaming" mobile device to a wireless service provider.

One such solution are so-called global phones. These devices often include one or more pre-programmed international mobile subscriber identities (IMSIs) and the user pre-pays for data and SMS data based on their destination country. In many of these systems, telephone calls are made via a call-back service, where a user dials out a number and then receives a call back that then connects the user to that number. This feature is helpful due to the fact that it is often less expensive to receive a call while roaming than to place a call. These devices often require a dedicated phone and a specially programmed subscriber identity module (SIM) card. If the user is expecting calls from or wishing to monitor their home service phone number, they must then carry two separate devices with them.

To address this concern of high roaming costs, some service providers have set up special service agreements with service providers in certain countries. Under these service agreements, a user from, for example, the United States, may be able to purchase a data, phone and/or SMS plan for a given period of time while visiting a foreign country, such as Mexico. Typically, the user pays a flat fee for a set amount of use within a set period of time.

Another solution for travelers outside of their home service area to avoid roaming charges is to purchase a SIM card from a local merchant. Such a SIM card, often used on a pre-paid basis, replaces the home SIM card in the user's device and allows the user to connect to a local service provider, changing their device into a local device which is no longer paying roaming fees.

One problem with this solution is that it requires a user to have a SIM card for each country they are visiting. Typically, these cards are purchased in the particular country, which requires the user to find a sales outlet for the local SIM card to make such a purchase. In some embodiments, these SIM cards may be usable in multiple countries, however, the number of countries is typically quite limited. Additionally, the user is required to swap out SIM cards and safely keep their home service SIM card for replacement. Because a SIM card is often small in size, care must be taken not to lose this home service SIM card. Another problem is that, when their home service SIM is removed from their device, the user is unable to receive phone calls or messages from others that are trying to reach the user at their home service phone number.

To address one of these problems, some hardware manufacturers have developed wireless devices that include the capability to contain two separate SIM cards. Therefore, a user can always keep their home service SIM placed in their phone and swap out foreign SIM cards as necessary while traveling. While this is a step in the right direction, the user still has to manage and track multiple SIM cards, especially when traveling to various countries during the same trip. Several attempts have been made to optimize the performance of such dual-SIM phones, including switching algorithms, ways to determine which SIM to use while roaming from both the home SIM and the foreign SIM (where the user did not purchase a separate, local SIM in a different country), and the like.

In view of the foregoing, it is clear that these traditional techniques are not perfect and leave room for more optimal approaches.

SUMMARY OF THE INVENTION

Embodiments of the present invention provide a method for using a wireless device when a user travels with the wireless device outside of a home service area to a foreign service area, where the method comprises opening a software application on the wireless device, the software application configured to provide the user with one or more service providers providing local service in the foreign service area; receiving a selection, from the user, on the wireless device, of a selected service provider; displaying, on the wireless device, one or more service plans offered by the selected service provider; receiving a second selection, from the user, on the wireless device, of a selected service plan; and writing necessary data to a global subscriber identity module (SIM), where the necessary data is sufficient to permit the wireless device to operate as a local device in the foreign service area, wherein the global SIM is selected from a stand-alone module plugged into a second SIM port of the wireless device, an inbuilt hardware module having capabilities to be configured as a SIM, and an add-on device having capabilities to be configured as a SIM.

Embodiments of the present invention further provide a method to provide local service for a wireless device when traveling in a foreign service area outside of a user's home service area, where the method comprises opening a software application on the wireless device, the software application configured to provide the user with one or more service providers providing local service in the foreign service area; receiving a selection, from the user, on the wireless device, of a selected service provider; displaying, on the wireless device, one or more service plans offered by the selected service provider; receiving a second selection, from the user, on the wireless device, of a selected service plan; receiving payment from the user for the selected service plan; writing necessary data to a global subscriber identity module (SIM), where the necessary data is sufficient to permit the wireless device to operate as a local device in the foreign service area; and rendering unusable the SIM data for the selected service plan after an expiration thereof, wherein the global SIM is selected from a stand-alone module plugged into a second SIM port of the wireless device, an inbuilt hardware module having capabilities to be configured as a SIM, and an add-on device having capabilities to be configured as a SIM; the global SIM stores more than one set of SIM data for more than one of the foreign service areas; and when the global SIM contains usable SIM data for multiple countries, the software application permits choosing between using the SIM data from the home service SIM, or any of the usable SIM data on the global SIM.

Embodiments of the present invention also provide a wireless device comprising a first, local subscriber identity module (SIM) containing SIM data for a home service area; a global SIM selected from a stand-alone module plugged into a second SIM port of the wireless device, an inbuilt hardware module having capabilities to be configured as a SIM, and an add-on device having capabilities to be configured as a SIM; and a software application (1) permitting the user to select one or more service providers providing local service in a foreign service area, (2) displaying, on the wireless device, one or more service plans offered by the selected service provider, (3) receiving a second selection, from the user, on the wireless device, of a selected service plan, and (4) writing necessary data to the global SIM, where the necessary data is sufficient to permit the wireless device to operate as a local device in the foreign service area.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art, many careful considerations and compromises typically must be made when designing for the optimal configuration of a commercial implementation of any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

A "wireless device" or "computer" may refer to one or more apparatus and/or one or more systems that are capable of accepting a structured input, processing the structured input according to prescribed rules, and producing results of the processing as output. A wireless device is capable of connecting, wirelessly, to a network for the interchange of data. Examples of a wireless device may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

"Software" may refer to prescribed rules to operate a computer or wireless device. Examples of software may include: code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Python, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code may also be distributed among a plurality of computational units wherein each unit processes a portion of the total computation.

A wireless network is a collection of links and nodes (e.g., multiple computers and/or other devices connected together) arranged so that information may be passed from one part of the wireless network to another over multiple links and through various nodes. Examples of wireless networks include GSM, code division multiple access (CDMA), and the like.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and wireless devices. Typically, a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASHEEPROM, any other memory chip or cartridge, a carrier wave as described hereinafter, or any other medium from which a computer can read.

Embodiments of the invention may be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in a hard disk drive, and the like. These computer program products may provide software to a wireless system. Embodiments of the invention may be directed to such computer program products.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory or may be communicated to an external device so as to cause physical changes or actuation of the external device. A "computing platform" may comprise one or more processors.

Figure 1:
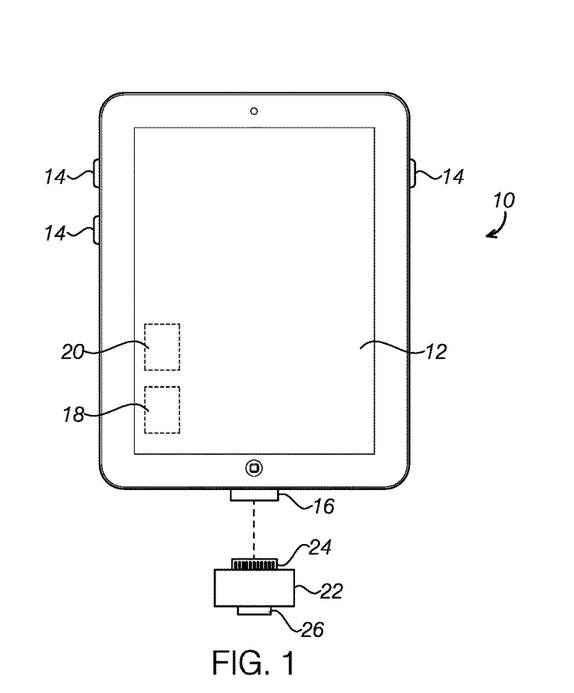
FIG. 1 illustrates a representation of an exemplary mobile device having hardware and software installed therein permitting the device to connect to wireless carriers in various countries and allow the user to set up a local account in such countries.

FIG. 1 illustrates a wireless device 10 that may be used to communicate wirelessly to a network, such as a GSM network for example. The wireless device 10 is shown as a mobile device, however, the wireless device 10 can take various forms, as described above. The wireless device 10 can include a display 12, such as a touchscreen interface, and various control buttons 14, configured to provide input to the wireless device 10.

The wireless device 10 may include one or more ports 16. The ports 16 may be used, for example, to connect a data connector, a power connector, or the like. While the port 16 is shown extending from a bottom surface of the wireless device 10, the port 16 may be disposed in various manners, including, for example, recessed into the device, where a cover may be disposed over the port when not in use.

The wireless device 10 can include a SIM 18, which is configured similarly to conventional wireless devices. The SIM 18 can be a home service SIM, where a user subscribes to a wireless service provider within their home territory. The SIM 18 may include details of the home service subscription, such as the IMSI, which typically includes the home service country code, network code and phone number, for example.

The wireless device 10 can further include a second SIM 20, also referred to as global SIM 20. The global SIM 20 can be installed into the wireless device 10 in various manners. In some embodiments, the global SIM 20 could be configured as a SIM card plugged into a second SIM slot in a dual SIM slot wireless device. In other embodiments, the global SIM 20 can be built into the mobile device via a specific hardware installation. In some embodiments, the global SIM 20 can be a single SIM, where the home SIM 18 and the global SIM 20 are combined in a single SIM card or integrated into a single in-built hardware implementation. In still other embodiments, the global SIM 20 can be externally attached via a SIM attachment 22. The SIM attachment 22 may include a plug 24 that can fit, for example, into port 16. The SIM attachment 22 may include a further port 26 to permit data transfer or charging without requiring the removal of the SIM attachment 22. The SIM attachment 22 may include an inbuilt global SIM 20, or may include a plug-in global SIM 20, for example. While the Figure shows the SIM attachment 22 attaching at the bottom of the device 10, the SIM attachment 22 may attach through various ports accessible on the device 10. This can even include the SIM port of the device 10, the audio port, a communication port, or the like. In some embodiments, the SIM attachment 22 can be completely detached from the device 10 and may communicate via a communication protocol, such as Bluetooth® or the like, to the device 10.

Figure 2:
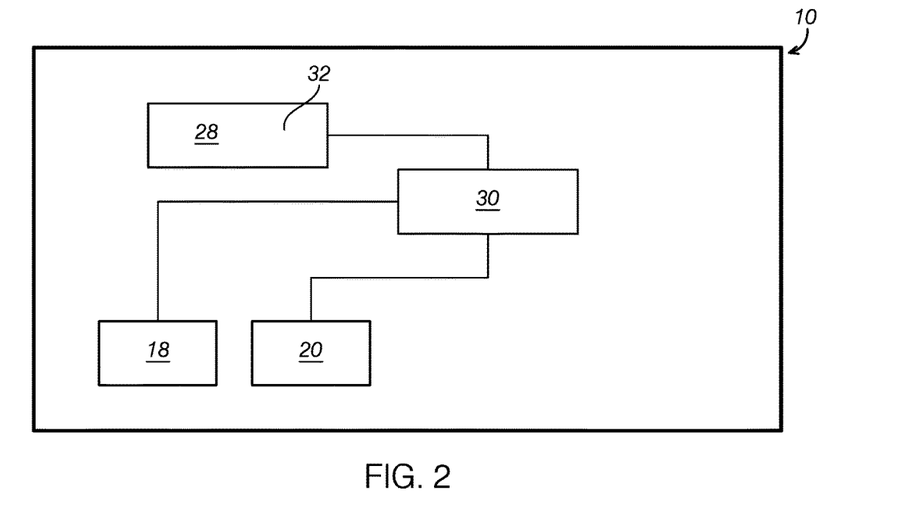
FIG. 2 illustrates a schematic representation of select internal components of the mobile device of FIG. 1.

Referring now to FIG. 2, the wireless device 10 is shown with select components illustrated. A processor 30 may be disposed within the wireless device 10 and the SIM 18 and the global SIM 20 can communicate with the processor 30. Additionally, memory 28 may be present in the wireless device 10 for storing various data. In some embodiments, software 32 may be disposed in the memory 28. The software 32 can be used, as described in greater detail below, to program the global SIM 20 with the necessary information for communication with a local wireless service provider in a particular country. The global SIM 20 may be programmed, via the software, to save multiple profiles for local wireless service provider access in multiple countries. The software 32 can be incorporated into a device 10 regardless of whether the global SIM 20 is installed or in-built into the device. The software 32 may communicate with other applications on the device 10. In this embodiment, transfer of data may be obtained from these other applications to save the user registration time and effort and to synchronize the data.

Figure 3:
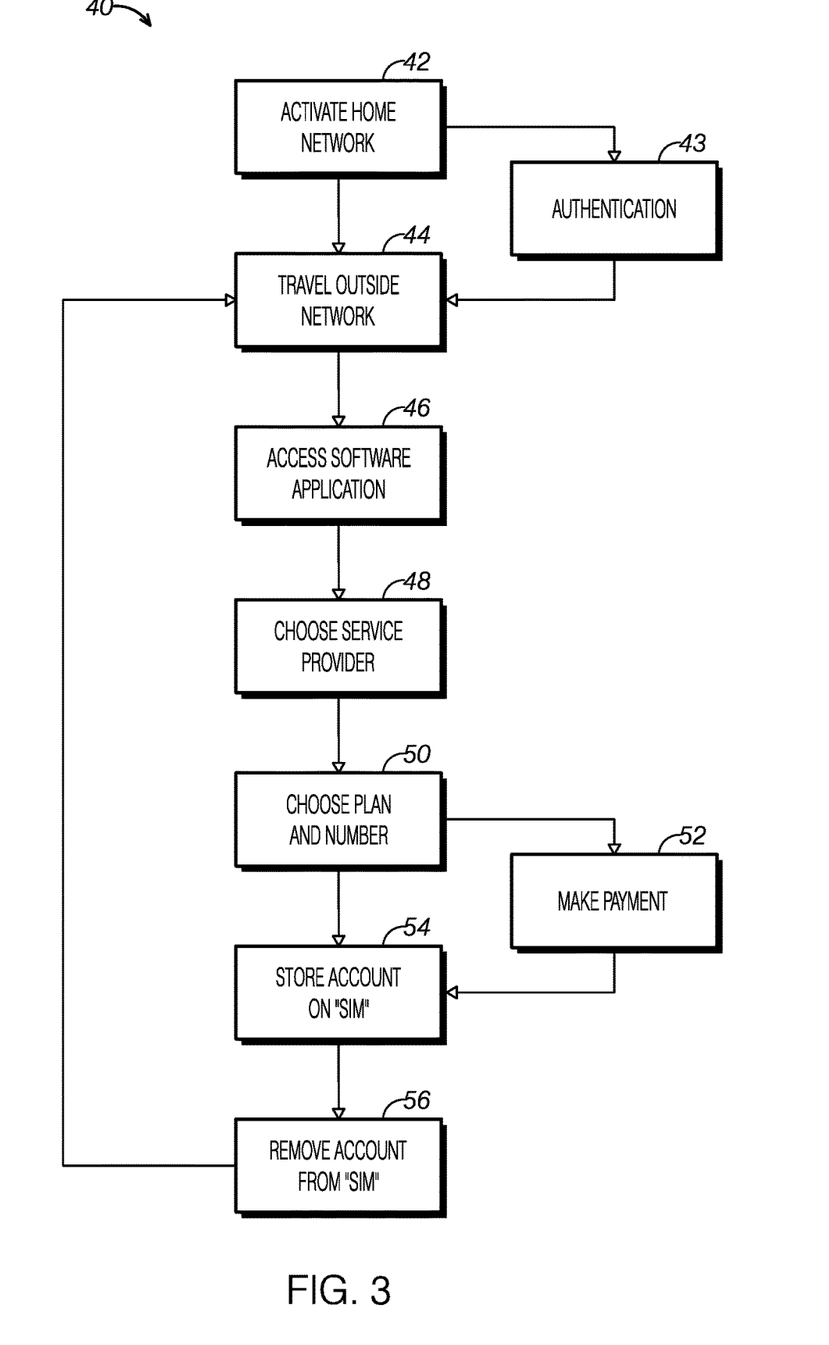
FIG. 3 illustrates a method for using the mobile device of FIG. 1, according to an exemplary embodiment of the present invention.

Referring to FIG. 3, a method 40 is shown describing a method according to an exemplary embodiment of the present invention. As discussed above, in step 42, a user activates their wireless device (such as wireless device 10) on a home network. This can be done in various manners are is conventional in the art. The wireless device can be built to include an inbuilt SIM, a dual SIM slot with a global SIM plugged therein, or could use an external device to add a second "SIM" to the wireless device.

In some embodiments, the activation on the home network can be performed via a service provider or, in other embodiments, the activation on the home network can be performed via the software installed on the phone that permits the user to purchase plans in various countries, as described in greater detail below. For example, if a user purchases a phone without any SIM card, the user can use the global SIM to obtain service in any country, with or without a "home country" designation. In other words, a global traveler could simply use the global SIM to purchase plans in whatever country they find themselves, without the need to have a full-time plan in any one country.

The user may be able to download the software application from an appropriate source. In some embodiments, when initially running the software application, at step 43, an authentication process can provide the users with a passcode to input and activate the application. Once activated, all necessary personal information will be updated in the software application. For all future transactions made on the application (purchase of service packages, and the like), users will only need to input their password to proceed. Users will be able to apply changes under "account settings" as desired.

In some embodiments, at step 43, the user may be required to submit further authentication before being able to use the application. The authentication may include scanning a passport, scanning a driver's license bar code, scanning a fingerprint, swiping a credit card, uploading a photo, or the like. Of course, other security features, as may be known in the art, are contemplated within the scope of the present invention.

The wireless device can also include a software application. The software application would store provider information or provide a means to access provider information. The provider information can include one or more providers in several countries outside the user's home area.

When the user travels outside their home network (in other words, to a "foreign service area"), in step 44, they can access the software application in step 46. The term "foreign service area" is defined to refer to a service area outside of a user's home service area. Of course, when using the global SIM of the present invention, the user's device operates like a local device, even though it is used in a "foreign service area."

Once in the software application, the user will be provided with one or more service providers in the country they are currently located. Additionally, from the software application, the user can view various packages available in each country, where the packages can include various time limits, data limits, telephone minutes, number of text message limits, and the like. The user, in step 48, selects one of the service providers and then, at step 50, chooses a plan and phone number. The packages can be set up for a day, multiple days, a week, a month, or any time period chosen by the user and available as a plan option. In some embodiments, the service package chosen could include only phone service, only data service, only SMS messaging, or the like, or various combinations thereof.

Access to the software application may be limited by the use of one or more security measures. These security measures may include a biometric scan, entering a password, entering a personal identification number (PIN), combinations thereof, or the like. The security features to access the software application may also be related to the process performed at optional step 43, where the user is authenticated to the device and/or service provider. The user may have the option to select the desired level of security. For example, the user may authenticate, at step 43, by scanning their driver's license. The user may select that, to access the software application, that the user must scan their driver's license again.

If necessary, in step 52, payment can be made to the service provider. In some embodiments, the payment may be done through billing to the home service provider, for example. In other embodiments, credit card or banking information may be stored by the software and/or entered by the user to make payment for the selected service plan. Payment can be made via various methods, including via pre-paid cards (where a user receives a code to enter for credit), Apple Pay, PayPal®, e-wallets, or other such electronic means as are known in the art. In some embodiments, the account associated with the user's device may include a pre-payment option, where a user can pre-pay a desired amount to their account. This feature may be useful so that the user, while traveling, can simply select a plan without having to worry about entering payment details. This feature may also be useful to users who may not have credit cards (e.g., minors).

Once the plan and provider information is chosen, in step 54, data about the plan, provider, and the like, is written to the global SIM 20. As discussed above, this global SIM may be a SIM card plugged into a second sim slot, a hardware implementation disposed directly in the wireless device 10, or may be an add on via the SIM attachment 22. Regardless of the physical implementation of the global SIM, the global SIM can be written with the necessary data (such as IMSI data) so that the wireless device is permitted to access the local network (that is, the network in the foreign country that is local to the foreign country) as a non-roaming, local device. This information can remain on the global SIM throughout the term of the purchased service plan.

The global SIM can be so configured so that multiple phone numbers may be used at different times. In other words, if a person is traveling to Mexico (day 1), Brazil (day 2), the U.K. (day 3) and back to Mexico (day 4-6), the user may purchase a week-long service plan on day 1 in Mexico. The phone number and data may be written onto the global SIM. The next day, day 2, in Brazil, the user may purchase a plan local to Brazil for one day. The phone number and data may be written onto the global SIM for local access in Brazil. At this point, the user has SIM data for three territories stored in the wireless device—the home country, the U.S. for example, Mexico and Brazil. The software application may be so configured to allow the user to select which SIM data is used at any given time. This may be useful, for example, if on day 2, the user flies from Brazil to the U.K. with a layover in Miami. The user can then direct the software to switch over to the U.S. SIM data, allowing home access, without losing the Mexico and Brazil access. In some embodiments, the software application can keep active multiple numbers simultaneously, allowing, for example, a user to receive calls made to their home country number, while also receiving made to their local number in a particular country.

In this example, on day 3, the Brazil service plans runs out and the SIM data for this plan is either removed from the global SIM or made inaccessible and allowed to be re-written over (step 60). In the U.K., the user can purchase a one-day service plan that permits them local access to data, phone, messages and the like. On days 4-6, the U.K. plan is no longer accessible and the user can select from the Mexico SIM data plan (which has several days left in the plan) or the U.S. service plan (which, however, would be considered as roaming while in Mexico). The user would typically select the Mexico service plan while in Mexico on days 4-6.

On day 7, the user can select, via the software application, their home service plan, as that would be the local service plan available to the user. On day 8, if no other plans are available, the wireless device will operate as a regular, local device, accessing the user's home service plan under their original service contract.

While the above refers to limited time plans, the plans could be permanent. For example, for a user in the U.S. that travels to Mexico frequently, it may make sense to have a permanent service plan, as this permits the use of the same number for each visit and could result in cost savings for the user. Even if the selected "foreign" service plan is permanent, the global SIM can also store other country service plans, as needed.

The global SIM can be configured to store one or more sets of SIM data, where SIM data is sufficient to permit the wireless device to operate as a local device on a local service plan. In some embodiments, the global SIM can be configured to store two, three, or more sets of SIM data. In some embodiments, where additional SIM data is required to be stored, the global SIM could rely on the memory 28 (see FIG. 2) for storing the needed SIM data. The software can provide data regarding the home service (primary) number, as well as any currently active "global" or secondary numbers. In some embodiments, the software can provide data regarding the expiration dates for plans purchased for the secondary numbers, options for extending the plans, and the like.

Certain offline options are provided for selecting service providers and plans which may be particularly useful to a user when initially entering a foreign service area (e.g., upon arriving in a foreign port without access to Wi-Fi). In some embodiments, the software stores all the necessary service provider data and plan data for each country. In this embodiment, the user does not need to have wireless access to choose a service provider or plan. In this embodiment, the software application's data can be updated whenever the user is within their local service area or connected through a no-data charge connection, such as Wi-Fi, for example. The data may be stored within the software application or may be stored in a separate database on the wireless device, in, for example, the memory 28 thereof.

In other embodiments, the software can store service provider data, where the user first chooses a service provider, then the phone is provided temporary access to that service provider for the sole purpose of selecting and paying for a service plan. In other embodiments, the software accesses the user's wireless data, perhaps at a roaming rate, to access service provider and plan information. Of course, other methods of choosing and selecting a service plan and service provider, as may be understood by one skilled in the art, are contemplated within the scope of the present invention.

While the above description uses the term "global SIM", this global SIM need not be a separate physical module. As discussed above, this global SIM could be inbuilt into the wireless device or plugged in as an add-on SIM, for example.

Various security measures may be incorporated into the hardware and/or software described above. For example, security features such as passport scanning, via photo, for example, may be used to ensure registration of a device. Other security features, such as passwords, PIN numbers, and the like, may be incorporated and are contemplated within the scope of the present invention.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a sub combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A method for using a wireless device when a user travels with the wireless device outside of a home service area to a foreign service area, comprising:
   opening a software application on the wireless device, the software application configured to provide the user with one or more service providers providing local service in the foreign service area;
   receiving a selection, from the user, on the wireless device, of a selected service provider;
   displaying, on the wireless device, one or more service plans offered by the selected service provider;
   receiving a second selection, from the user, on the wireless device, of a selected service plan; and
   based on the second selection, writing necessary data to a global subscriber identity module (SIM), where the necessary data is sufficient to permit the wireless device to operate as a local device in the foreign service area, wherein the global SIM is selected from a stand-alone module plugged into a second SIM port of the wireless device, an inbuilt hardware module having capabilities to be configured as a SIM, and an add-on device having capabilities to be configured as a SIM.

2. The method of claim 1, wherein the selected service plan has an expiration date.

3. The method of claim 2, wherein, at the expiration data, SIM data for the selected service plan is rendered unusable by the software application.

4. The method of claim 1, further comprising choosing, via the software application, to use SIM data from a home service SIM or the global SIM.

5. The method of claim 4, wherein, when the global SIM contains usable SIM data for multiple countries, the software application permits choosing between using the SIM data from the home service SIM, or any of the usable SIM data on the global SIM.

6. The method of claim 1, further comprising purchasing the selected service plan via the software application.

7. The method of claim 6, where payment for the selected service plan is made to a local service provider in the home service area.

8. The method of claim 1, wherein the global SIM stores more than one set of SIM data for more than one of the foreign service areas.

9. The method of claim 1, wherein the one or more service providers are stored in the software application and provided to the user for selection without requiring wireless communication data.

10. The method of claim 9, wherein the one or more service plans are stored in the software application and provided to the user for selection without requiring wireless communication data.

11. A method to provide local service for a wireless device when traveling in a foreign service area outside of a user's home service area, comprising:
    opening a software application on the wireless device, the software application configured to provide the user with one or more service providers providing local service in the foreign service area;
    receiving a selection, from the user, on the wireless device, of a selected service provider;
    displaying, on the wireless device, one or more service plans offered by the selected service provider;
    receiving a second selection, from the user, on the wireless device, of a selected service plan;
    receiving payment from the user for the selected service plan;
    based on the second selection, writing necessary data to a global subscriber identity module (SIM), where the necessary data is sufficient to permit the wireless device to operate as a local device in the foreign service area; and
    rendering unusable the SIM data for the selected service plan after an expiration thereof, wherein
    the global SIM is selected from a stand-alone module plugged into a second SIM port of the wireless device, an inbuilt hardware module having capabilities to be configured as a SIM, and an add-on device having capabilities to be configured as a SIM;
    the global SIM stores more than one set of SIM data for more than one of the foreign service areas; and
    when the global SIM contains usable SIM data for multiple countries, the software application permits choosing between using the SIM data from the home service SIM, or any of the usable SIM data on the global SIM.

12. The method of claim 11, where payment for the selected service plan is made to a local service provider in the home service area.

13. The method of claim 11, wherein the one or more service providers are stored in the software application and provided to the user for selection without requiring wireless communication data.

14. The method of claim 13, wherein the one or more service plans are stored in the software application and provided to the user for selection without requiring wireless communication data.

15. A wireless device comprising:
- a first, local subscriber identity module (SIM) containing SIM data for a home service area;
- a global SIM selected from a stand-alone module plugged into a second SIM port of the wireless device, an inbuilt hardware module having capabilities to be configured as a SIM, and an add-on device having capabilities to be configured as a SIM; and
- a software application (1) permitting the user to select one or more service providers providing local service in a foreign service area, (2) displaying, on the wireless device, one or more service plans offered by the selected service provider, (3) receiving a second selection, from the user, on the wireless device, of a selected service plan, and (4) based on the second selection, writing necessary data to the global SIM, where the necessary data is sufficient to permit the wireless device to operate as a local device in the foreign service area.

16. The wireless device of claim 15, wherein the software application has a user interface permitting the user to choose to use SIM data from a home service SIM or the global SIM.

17. The wireless device of claim 15, wherein the global SIM stores more than one set of SIM data for more than one of the foreign service areas.

18. The wireless device of claim 15, wherein the one or more service providers are stored in the software application and provided to the user for selection without requiring wireless communication data.

19. The wireless device of claim 18, wherein the one or more service plans are stored in the software application and provided to the user for selection without requiring wireless communication data.

* * * * *